April 15, 1941.  G. R. R. LEWIS  2,238,176
MANUFACTURE OF TWISTED CORDS AND TWISTED THREADS
Filed Aug. 1, 1938   7 Sheets-Sheet 1

April 15, 1941. G. R. R. LEWIS 2,238,176
MANUFACTURE OF TWISTED CORDS AND TWISTED THREADS
Filed Aug. 1, 1938 7 Sheets-Sheet 2

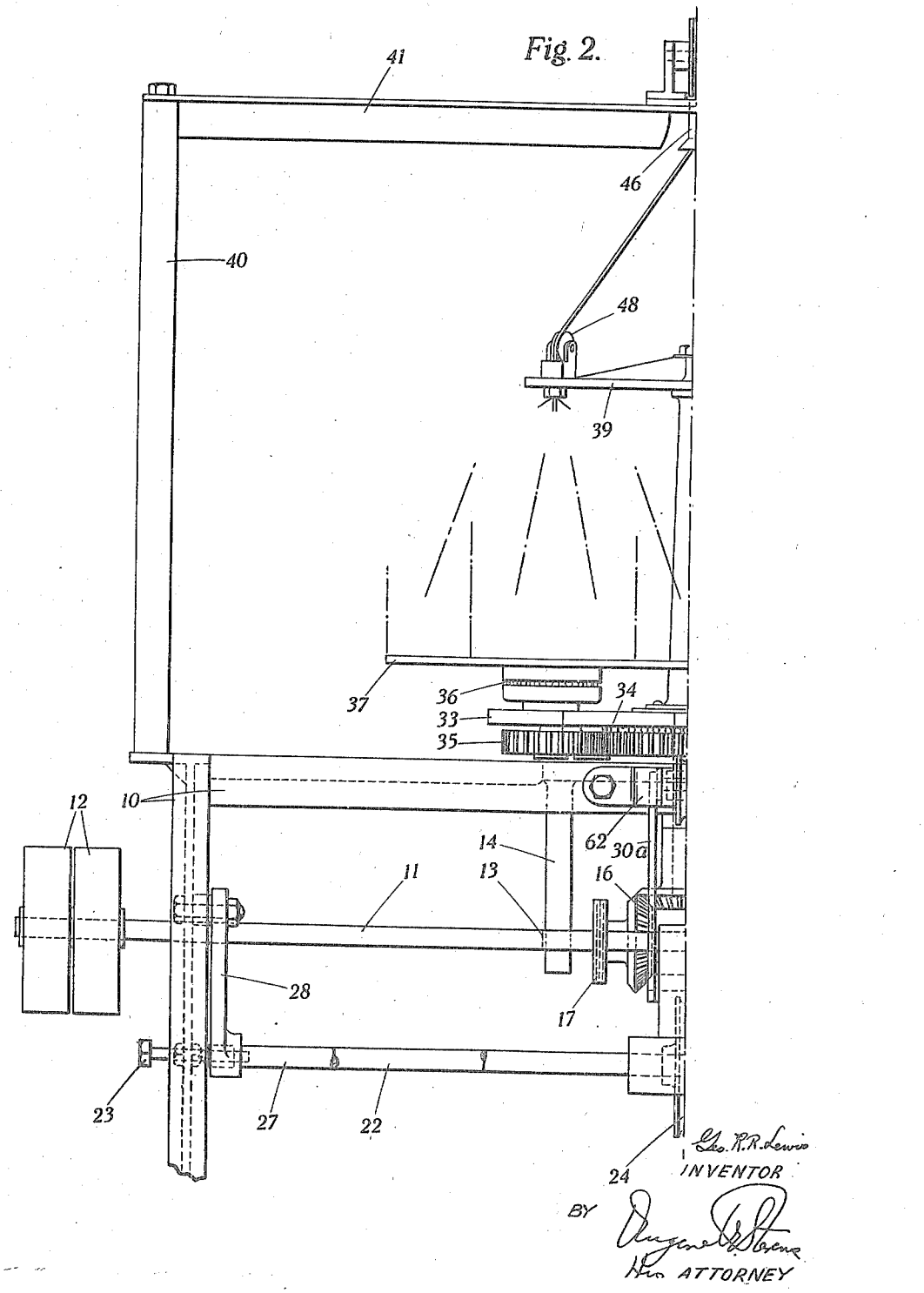

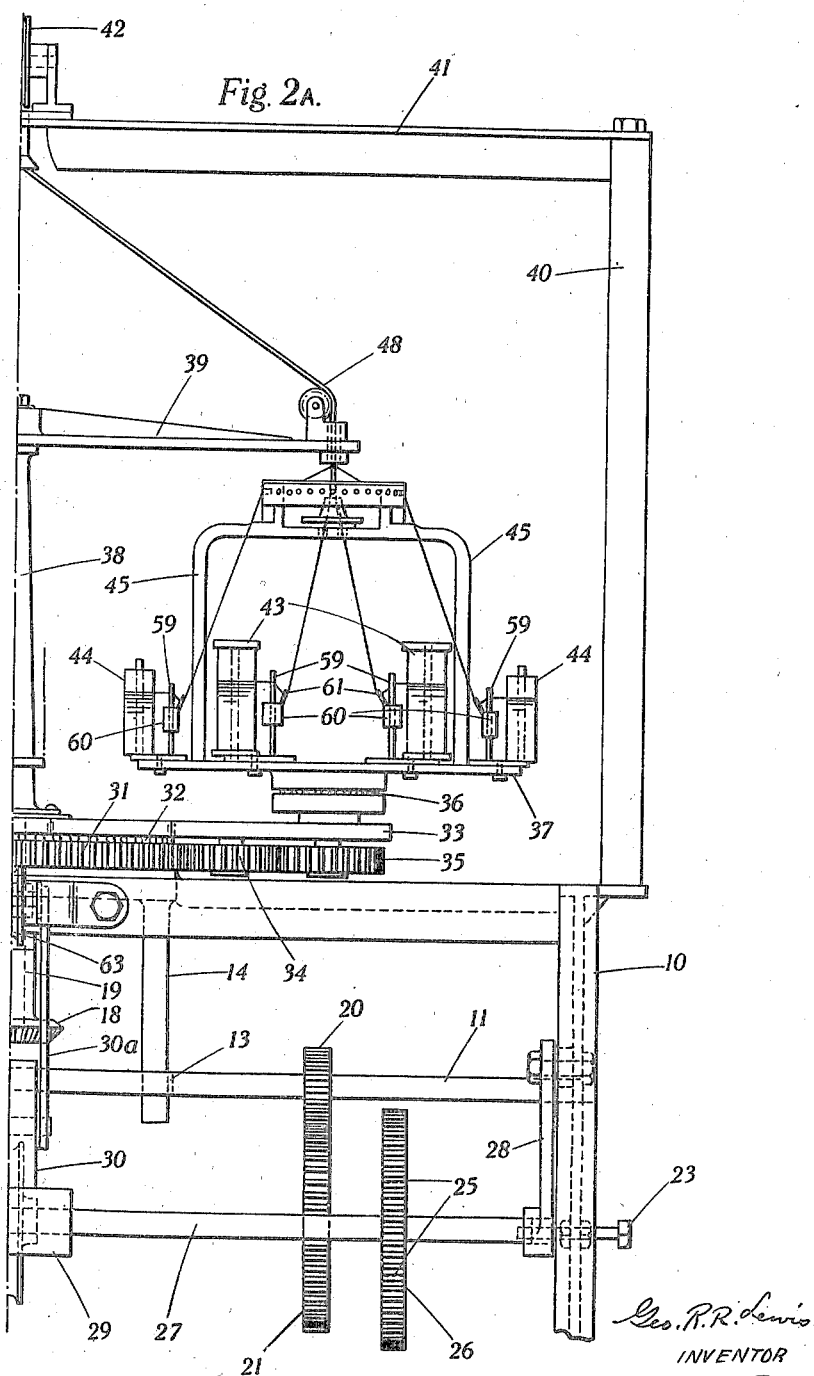

April 15, 1941.   G. R. R. LEWIS   2,238,176
MANUFACTURE OF TWISTED CORDS AND TWISTED THREADS
Filed Aug. 1, 1938   7 Sheets-Sheet 5
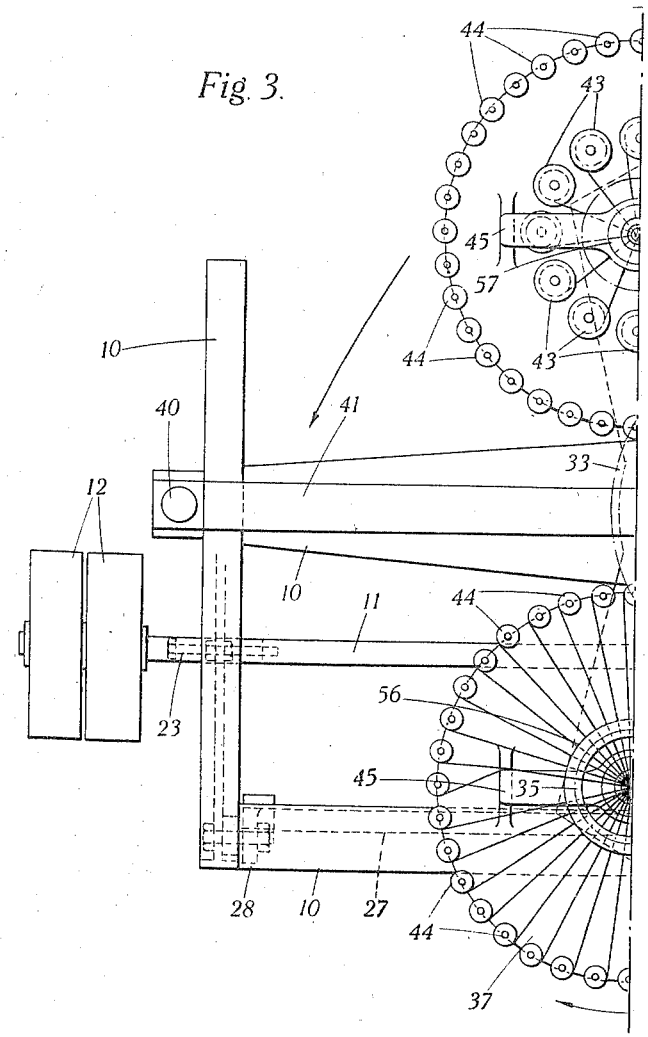
Fig. 3.

April 15, 1941. G. R. R. LEWIS 2,238,176
MANUFACTURE OF TWISTED CORDS AND TWISTED THREADS
Filed Aug. 1, 1938 7 Sheets-Sheet 6

George R. R. Lewis
INVENTOR
BY
ATTORNEY

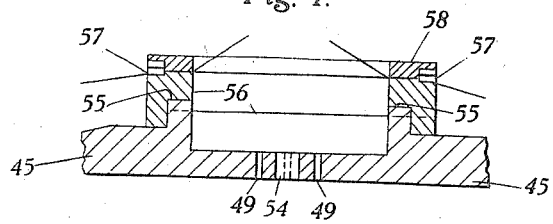
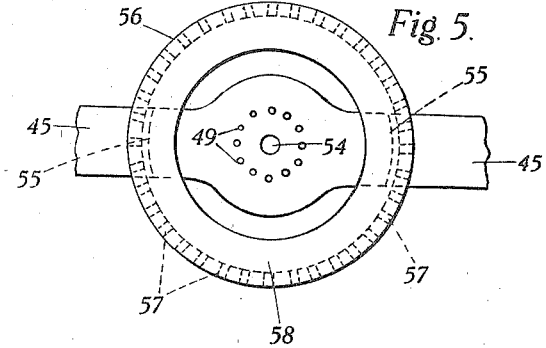
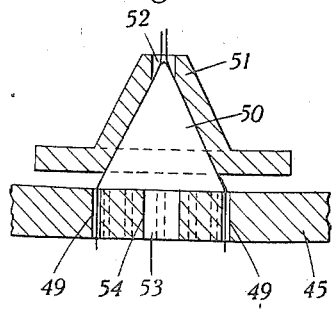

Patented Apr. 15, 1941

2,238,176

UNITED STATES PATENT OFFICE 2,238,176

MANUFACTURE OF TWISTED CORDS AND TWISTED THREADS

George Raymond Rushworth Lewis, Manchester, England

Application August 1, 1938, Serial No. 222,508
In Great Britain August 6, 1937

2 Claims. (Cl. 57—164)

This invention has reference to the manufacture of twisted cords and twisted threads and has for its object to provide a machine which will manufacture twisted cords and twisted threads from a plurality of individual threads or filaments in one continuous operation, the invention being particularly applicable to the manufacture of such cords and threads which have a centre or core of one kind or colour, and have a coating or covering of another, e. g. a cotton core and a silk coating or covering.

Twisted cords and twisted threads—hereinafter referred to as "cords"—are well known and covered or decorated cords are also well known, but the present method of manufacture of such cords by hand in a rope-walk is laborious, slow and uncertain, in that the covering and twisting are frequently uneven, and cords so made often vary in thickness, weight per foot, and pitch of twist, even though they are not intended to do so; a further disadvantage is that the length of unjoined cord made cannot be greater than the length of the rope-walk and much greater lengths are frequently required.

By means of this invention these objections are overcome and a cord of the kind referred to, that is "covered" or "decorated" cord, can be produced which is uniformly twisted throughout its length at the pitch desired and in which all the filaments and strands are evenly spaced, the length of the cord made being as small or great as may be reasonably required.

According to this invention covered or decorated twisted cords are made continuously on a machine having rotating members on which are mounted thread or filament containers from which inside or core threads or filaments, and outside or covering or decorating threads or filaments, are drawn and twisted through a nozzle above each of such rotating members, each rotating member and its nozzle revolving in a direction the reverse of that of their rotation whereby the twisted strands issuing from each nozzle are twisted together in the reverse direction as they pass through a further common nozzle, the cord issuing from this common nozzle being drawn out by a winding mechanism.

This invention is more particularly set forth with reference to the accompanying drawings wherein—

Figs. 2 and 2a show a rear elevation.

Figs. 3 and 3a show a plan.

Fig. 4 is a sectional elevation of a tensioning device.

Fig. 5 is a plan.

Fig. 6 is a section of a further tensioning device and

Figure 1:
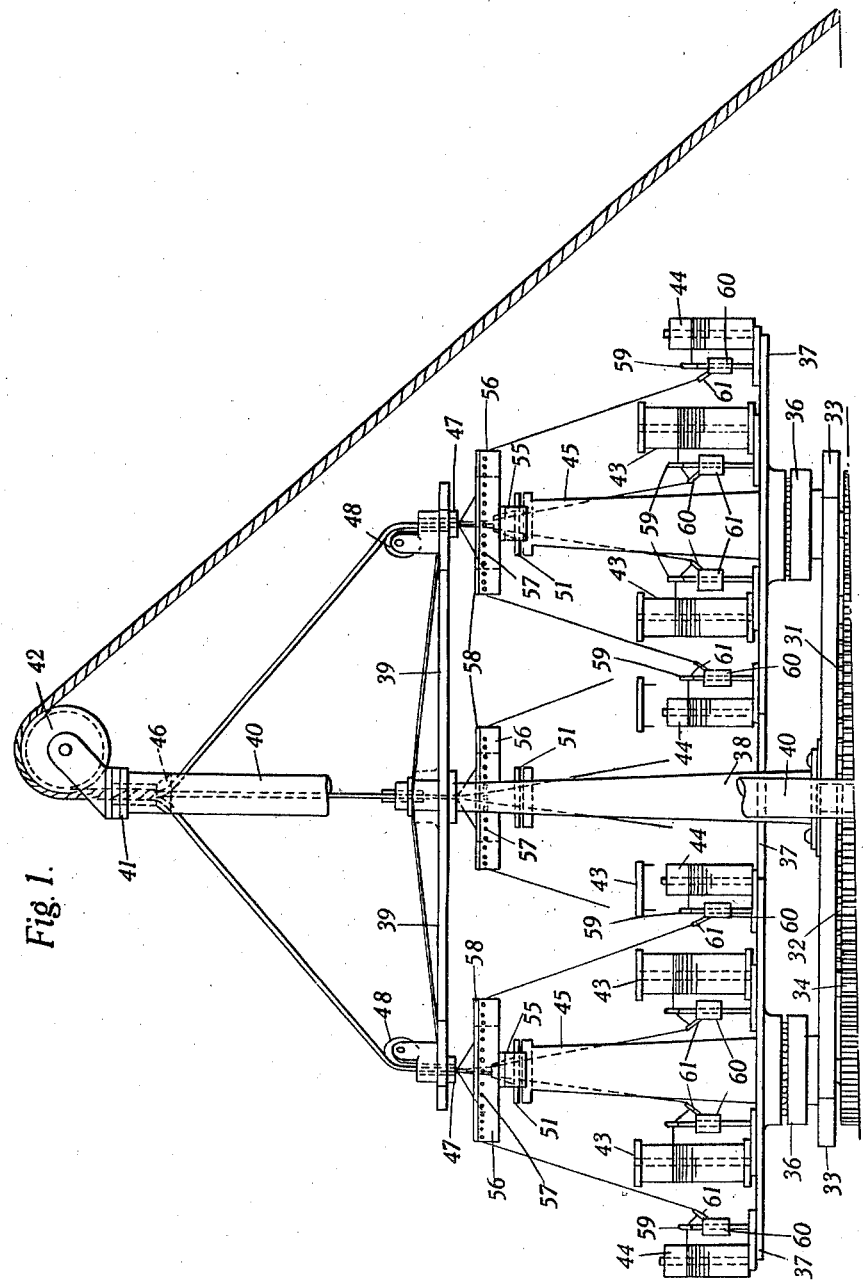
Figs. 1 and 1a show an end elevation of a machine according to the invention.

A machine for making twisted, covered cords is shown in the drawings, and comprises a suitable framework 10 across which there runs a main driving shaft 11, which may be driven by a belt on the pulley 12 or by a motor or other convenient means. Parallel with this shaft 11 and behind it, is a short shaft 13 carried in brackets 14, and which has upon it a chain sprocket wheel 15 and a bevel wheel 16, the chain sprocket being driven by a chain from another chain sprocket 17 on the shaft 11. The bevel wheel 16 meshes with a bevel wheel 18 on a vertical shaft 19. Also on the shaft 11 is a toothed pinion 20 meshing with a toothed wheel 21 on a shaft 22 below, this shaft being mounted detachably on centre bearings 23 so that the pinion can easily be changed as may be required; on this shaft 22 is a grooved roller 24, and a further pinion 25 gearing with a wheel 26 on a shaft 27 mounted in arms 28 detachably mounted on the frame 10.

On the front shaft 27 is a roller 29 having a friction face and bearing against this roller 29 is a weight roller 30 in swinging arms 30a mounted on the frame 10.

The pinions 21 and 25 and the wheel 26 are all easily detachable from their shafts so that the gear ratios can be altered as desired and to this end the shafts are detachably mounted as described.

The vertical shaft 19 passes upwardly through the centre of a fixed sun-wheel 31 which has a ball race 32 on the top supporting a plate 33 rotated by the shaft 19 carrying on its underside three idle pinions 34 and three pinions 35, each on a spindle passing upwardly through the plate 33. Around each of the spindles of the pinions 35 is a ball race 36, the bottom part being fixed on the plate and the top part being fixed on the underside of a further plate 37, which is easily detachable so that plates of different sizes can be used, or a full plate can be put on the machine in place of an empty one.

The plate 33 also carries a central pillar 38 at the top of which a spider 39 is mounted, the ends of the arms being vertically dead over the centres of the plates 37.

Two arms 40 at opposite ends of the machine carry a cross member 41 having an opening in it directly over the centre of the shaft 19, and on the top is a pulley 42.

Each of the plates 37 has upon it two sets of pins on which an inside and outside ring of bobbins or yarn or thread containers can be mounted the bobbins on the inside ring being designated by the numeral 43 and the outside ring by 44. Further, each plate 37 has two arms supporting a cross member 45, which supports certain guide and tensioning devices described more fully later on.

Figure 3A:
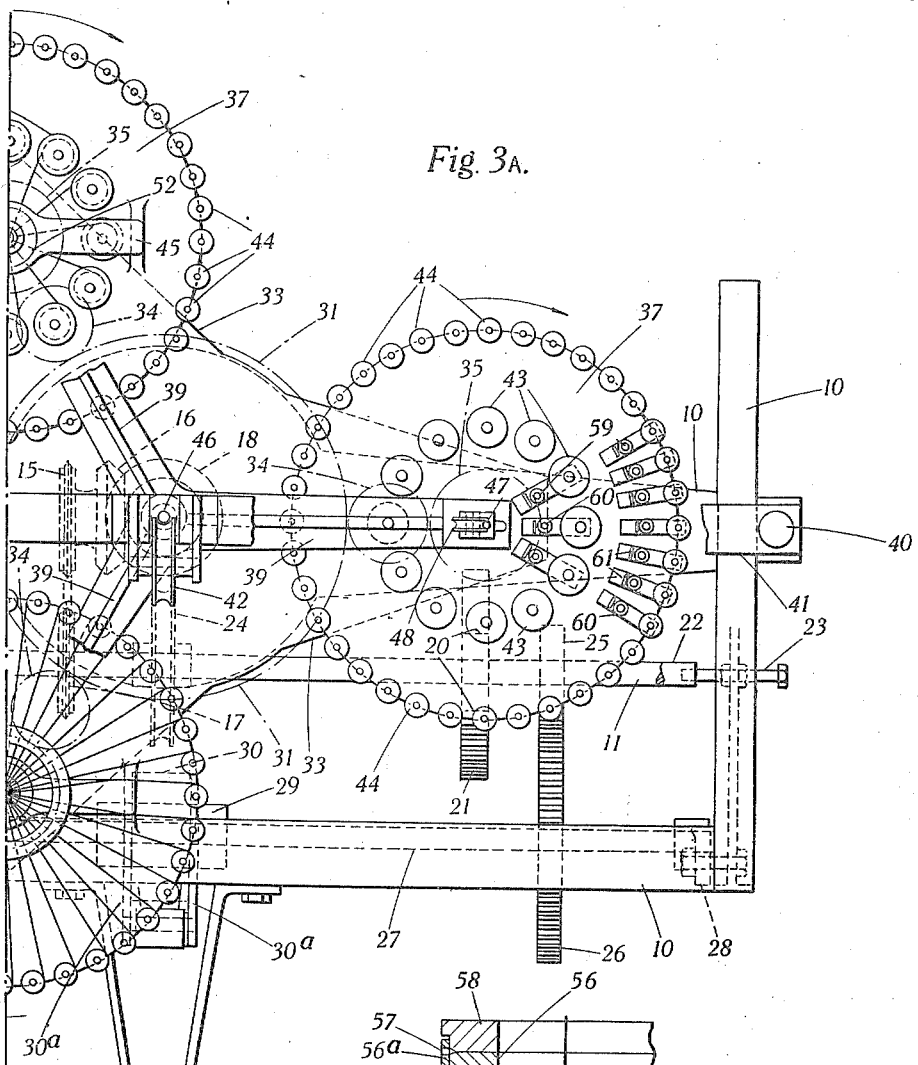

It will be seen that when the machine is set in motion the plate 33 and the spider 39 will be rotated and everything carried thereon will also rotate but as the sun-wheel 31 is fixed, it follows that as the mass rotates the plate 37 while revolving round the shaft 19 will also, by the sun and planet mechanism, rotate in the opposite direction on the bearings 36, the direction being shown by the arrows in Figs. 3 and 3a.

In the opening in the cross arm 41 is a nozzle 46 and in the end of each arm of the spider 39 is a nozzle 47 conveniently mounted in the bearing of a pulley 48 in a slot so as to be adjustable within limits along the spider arm.

The cross members 45 above the plates 37 have a number of holes 49 (see Fig. 6) equally spaced about the axis of rotation of the plate, and directly above is a cone 50 also with its axis on the axis of rotation and upon this there rests a hollow cone 51 having an opening 52 at the top, the cone is held in place by a peg 53 inserted in a hole 54.

The cross members 45 also have upstanding supports 55 (see Fig. 4) on which is mounted a ring 56 having holes 57 in it and a top ring 58 which rests in a groove in the ring 56 as clearly shown in Fig. 4.

Adjacent to each bobbin pin is a further pin 59 having upon it a sliding weight 60 with a guide eye 61. An arm 62 projects from one side of the machine and has a pulley 63 at the end of it.

When the machine is being set up for making a covered or decorated cord the inside ring of pins on each plate 37 is provided with bobbins or other containers having upon them the yarn or thread, for instance cotton, thus making the inside ring of bobbins 43, and each end is passed through the eye 61 on the sliding weight 60 on the adjacent pin 59, this weight acting as a tensioning device. The end is then passed through its hole 49 and up the face of the cone 50 and when all the ends required have been so threaded equidistantly apart, the hollow cone 51 is placed over them, the bunch of ends being taken through the opening 52 at the top and passed through the nozzle 47, and over the pulley 48 where, for the time being, they can be secured.

In a similar way the outside ring of bobbins 44, which may be, for example, of silk or of finer, or differently coloured yarn from the yarn on the bobbins 43 are mounted and tensioned by the weight 60 and are then passed through the holes 57, after which the ring 58 is put in place, and these ends are passed through the nozzle 47 and over the pulley 48.

The cone 50 and the hollow cone 51 which rests on the threads, constitute both a guide and a tensioning device and it will be seen that owing to this cone arrangement the threads are drawn upward in a skeleton cone which keeps them equally spaced.

In the same way the holes 57 and the top ring 58, space and tension the other threads.

The relative positions of the threads are shown in elevation in Figs. 1, 2, 2a, 4 and 6 and in plan in Figs. 3 and 3a.

Figure 1A:
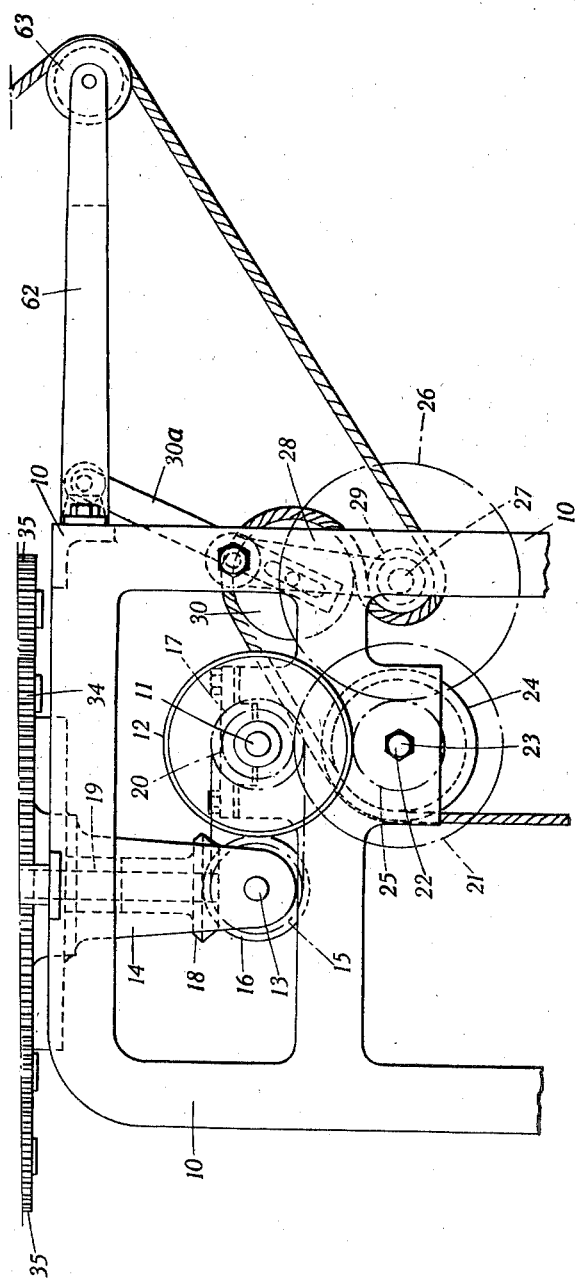

When the various thread ends have all been threaded through the nozzles 47 they can be tied into bunches and the tying threads are then passed through the nozzle 46 over the pulleys 42 and 63 under the roller 29 and round the rollers 30 and 24 as shown in Figs. 1 and 1a or sufficient length of yarn or thread may be drawn off the bobbins for the same purpose, but this entails waste of material.

When the threading has been completed the machine is set in motion, and the plate 33 and spider 39 rotate in one direction taking the plates 37 with them and these, by the sun and planet motion, while revolving in one direction rotate in the opposite direction, and at the same time the shafts 22 and 27 are rotated. It has already been stated that the shafts 22 and 27 are readily detachable so that the engaging gear wheels can be changed to give different speed ratios, and for the same reason the bearings 36 and the wheels 35 below them and the nozzles 47 are mounted adjustably in slots, so that different sizes of wheels 35 can be used as may be required to cooperate with the gears on the shaft below.

As each plate 37 rotates on its own axis the threads are pulled by the rollers below at a coordinated speed as decided by the gearing used, and the threads passing through each nozzle 47 are twisted, the threads from the inside ring of bobbins forming what may be described as a core with the threads from the outside ring of bobbins forming a covering which is evenly spaced over the core, so that the twisted strands between the nozzles 47 and 46 appear to be made entirely of the material used in the outside ring of bobbins.

When the three twisted strands reach the nozzle 46 they are twisted together in the opposite direction to form a cord which is carried round the various pulleys as shown in Figs. 1 and 1a and may be wound on a reel or deposited in a receptacle.

Figure 7:
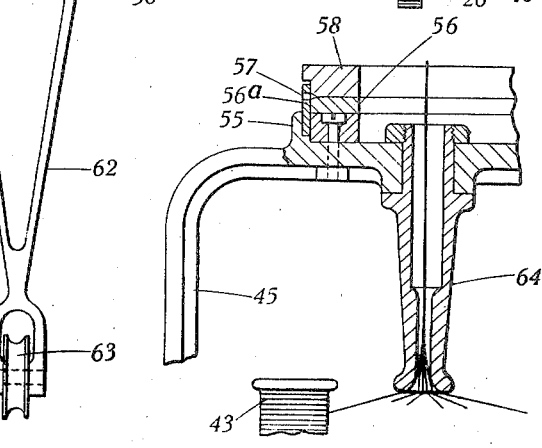
Fig. 7 is a part sectional elevation of an alternative detail.

In Fig. 7 a modified construction of a detail is shown in part sectional elevation.

In this arrangement the threads from the inside ring of bobbins 43 are drawn through a nozzle 64 detachably supported in the cross member 45 which also carries the bottom ring 56 and an outside ring 56a conveniently of porcelain around the bottom ring 56, and having the holes 57 in line with the divisions between the top and bottom rings 56 and 58, and in this arrangement the cone 50 and the hollow cone 51 are dispensed with thus obviating the need for individually threading the holes 49. This arrangement provides for a twisting of the threads from the inside ring of bobbins before the outside threads are twisted on, thus ensuring the production of a firm core on which the covering or decorating strands are laid.

For convenience of illustration and description the bobbins have been shown and referred to as being in two concentric rings but such an arrangement is not necessary though is probably convenient, as all the bobbins may be in one ring, but it is essential that the various threads should be drawn off in their proper respective inside and outside positions.

If, during the twisting operation a thread end should break its tensioning weight 60 will fall and indicate that the end is "down," and if desired these falling weights may be used to close an electric circuit and illuminate a warning light, and if desired also to knock-off and stop the machine.

By means of this invention a twisted covered cord can be made in any length required as in the event of bobbins running empty the machine can be stopped and new bobbins put in place and the ends joined up.

It will be appreciated that by means of this invention cord can be made having any desired degree of twist in either the strands or in the finished cord and that by noting the gears used for the twisting any cord made can be repeated exactly, in so far as the degree of twist is concerned, and further all the cord made with any one setting of the gears will have a uniform twist throughout its length which effects a great saving in the amount of covering material used, which is usually more costly than the material to be covered, and thus less is required than by the present methods of manufacture where the twist often varies considerably and also the quantity of material used.

While the invention has been described with reference to a machine having three rotating plates for the bobbins it is not limited to this number as two or more may be used according to requirements.

A reversing gear can be used so that the machine can run in either direction.

What I claim as my invention and desire to secure by Letters Patent is:

1. In a machine for the manufacture of twisted and covered textile cords a supporting plate mounted to rotate in a horizontal plane, a vertical shaft rotating said supporting plate, a sun-wheel fixed about the axis of said vertical shaft and supporting said supporting plate, a vertical pillar mounted centrally on said supporting plate, a spider on the top of said pillar, secondary plates rotatably mounted on said supporting plate, each secondary plate rotated by a spindle passing upward through said supporting plate and having a pinion below said supporting plate rotated by said sun-wheel, each of said secondary plates having two concentric rows of bobbins on vertical supports each containing textile thread each of said secondary plates having two vertical arms carrying a cross member, said cross member having mounted on the axis of said secondary plate a thread guide and tensioning device for the threads from the inside ring of bobbins whereby said threads are twisted together at one vertical level and above this a thread guide and tensioning device for the covering threads from the outside ring of bobbins, nozzle openings in said spider axially aligned with said thread guides and tensioning devices through which said twisted threads are drawn and wherein said threads from said outside ring of bobbins are wound thereupon to form a covered strand, all said covered strands being passed upward through a nozzle opening non-rotatably mounted on the axis of said sun-wheel and wherein said covered strands are twisted together under tension, said supporting plate and said secondary plates rotating on their axes in opposite directions.

2. In a machine for the manufacture of twisted and covered textile cords a sun-wheel, a supporting plate mounted on said sun-wheel, a vertical shaft carrying and rotating said sun-wheel and said supporting plate, planet wheels below said supporting plate rotated by said sun-wheel, spindles in said planet wheels projecting upwardly through said supporting plate, a secondary plate mounted above each planet wheel spindle and rotated thereby, two concentric rows of bobbins on each secondary plate on vertical supports, said inside row of bobbins containing textile threads, each secondary plate having two diametrically opposed vertical arms supporting a cross member, said cross member supporting on the axis of said secondary plate a tensioning device for said threads on said inside ring of bobbins, said tensioning device comprising a support with radially disposed vertical holes, a cone above having its base aligned with the centres of said holes, said threads being passed up said holes and lying along the face of said cone and being held in place and tensioned by a hollow cone resting on said threads on said cone face, said threads being gathered together, twisted by the rotation of said secondary plate, while in contact with a non-rotating nozzle above, a second tensioning device above said cone, comprising a ring, radial slots in the top face of said ring, a complementary ring resting on said ring below and by its weight applying tension to the threads from said outside ring of bobbins, which are passed through said radial slots and lying between said ring faces said threads being carried to said non-rotating nozzle above, where they are wrapped, untwisted, round said twisted threads, to make one covered strand of the final cord, said strands being twisted together in the opposite direction to the twist of the internal twisted threads of each strand, under tension in a non-rotating nozzle on the axis of the sun-wheel.

GEORGE RAYMOND RUSHWORTH LEWIS.